United States Patent [19]

Chaimowicz

[11] Patent Number: 4,711,578
[45] Date of Patent: Dec. 8, 1987

[54] OPTICAL DISPLACEMENT SENSORS

[75] Inventor: Jean-Claude A. Chaimowicz, London, England

[73] Assignee: National Research Development Corporation, London, England

[21] Appl. No.: 744,383

[22] Filed: Jun. 13, 1985

[30] Foreign Application Priority Data

Jun. 14, 1984 [GB] United Kingdom ............... 8415128

[51] Int. Cl.$^4$ ............................................. G01B 11/14
[52] U.S. Cl. .................................. 356/375; 250/227
[58] Field of Search ............... 356/375; 250/201 AF, 250/227

[56] References Cited

U.S. PATENT DOCUMENTS

| | | | |
|---|---|---|---|
| 3,940,608 | 2/1976 | Kissinger et al. | 250/227 |
| 4,201,479 | 5/1980 | Lardon | 356/445 |
| 4,515,479 | 5/1985 | Pryor | 356/375 |

FOREIGN PATENT DOCUMENTS 1062967 3/1967 United Kingdom .
2077421 12/1981 United Kingdom ......... 250/201 AF Primary Examiner—R. A. Rosenberger
Assistant Examiner—Crystal D. Cooper
Attorney, Agent, or Firm—Cushman, Darby & Cushman

[57] ABSTRACT

An optical displacement sensor comprises a light source 2 coupled to an optical fiber 1 the end 5 of which is directed onto a reflector 3 the displacement of which is to be measured. A lens 4 of appropriate focal length is positioned between the end of the optical fiber and reflector 3 to focus the light emitted from fiber 1 onto reflector 3 so that the amount of light reflected back is a function of the position of reflector 3. A signal detector 6 is also coupled to fiber 1 to detect and measure the light reflected back from reflector 3. Additionally a further light source 8, optical fiber 7 and detector 10 are provided with the end 9 of fiber 7 positioned at the focus of lens 4 so that the light reflected back to detector 10 is independent of the position of reflector 3. The ratio of the measurements from the two detectors gives the position of the reflector 3 with compensation for the effects of the deterioration of its reflectance.

4 Claims, 4 Drawing Figures

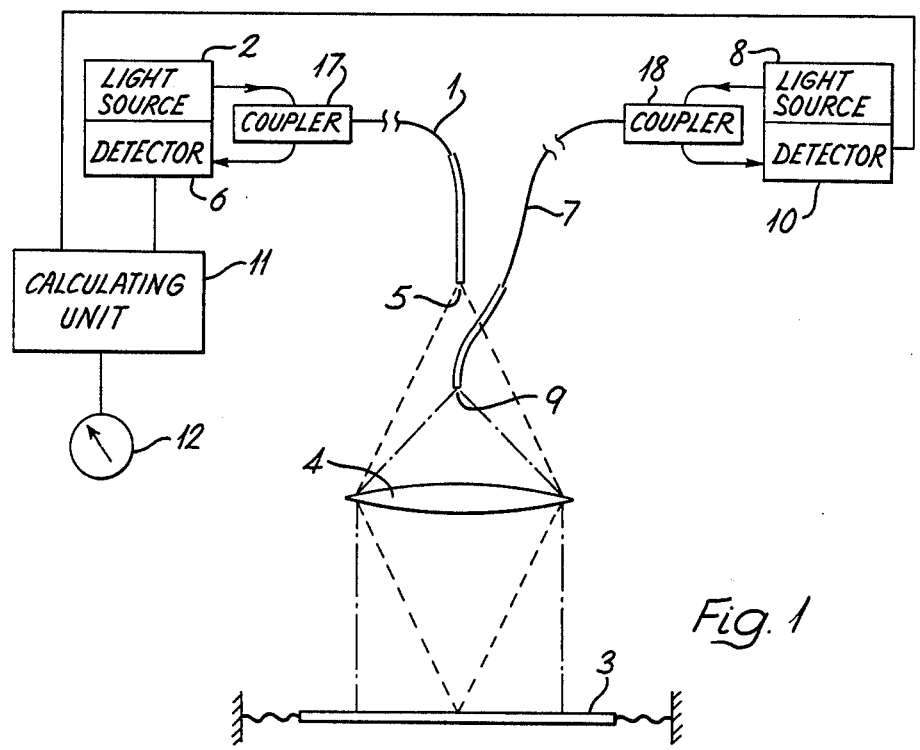
Fig. 1
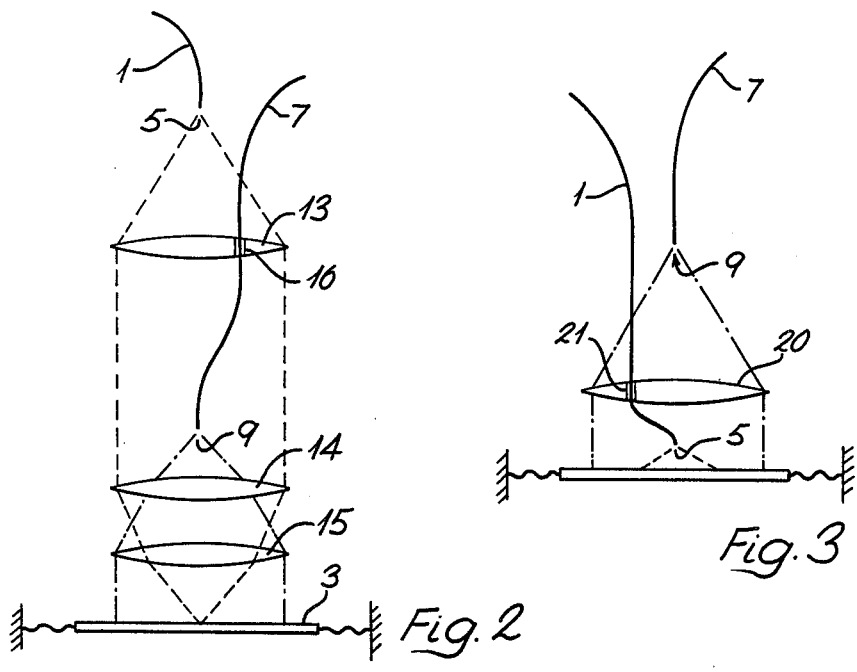
Fig. 2
Fig. 3

OPTICAL DISPLACEMENT SENSORS

BACKGROUND OF THE INVENTION

This invention relates to optical displacement sensors and has application in pressure sensors in which pressure is indicated by the displacement of a diaphragm.

One known kind of optical displacement sensor comprises an optical fibre the tip of which is positioned to direct light transmitted along the fibre onto a reflector the displacement of which is to be measured. The reflector may comprise a diaphragm or membrane having a reflecting surface and forming part of a pressurised enclosure. The optical system is arranged so that the change in the amount of light reflected back is a measure of the displacement of the reflector. The reflected light is measured and its value indicated to give a measure of displacement or pressure. Desirably the optical system is arranged so that the change in reflected light is linearly related to displacement.

While a sensor of the kind described above is accurate immediately after calibration it will be appreciated that the magnitude of the detected signal depends not only on the position of the reflector but also on any change in its reflectance that occurs after calibration. This quantity may be subject to aging and will affect the accuracy of the measurement.

It is an object of the invention to provide compensation for the effects of such aging.

SUMMARY OF THE INVENTION

According to the invention an optical displacment sensor comprises a reflector the displacement of which is to be measured, a radiation source coupled to an optical fibre one end of which is directed onto the reflector so as to illuminate the reflector with radiation from the source, signal detector means for detecting and measuring radiation reflected back from the reflector and arranged so that the amount of the reflected radiation detected is a function of the position of the reflector, and reference detector means for detecting and measuring radiation reflected back from the reflector and arranged so that the amount of the reflected radiation detected in the reference detector means is independent of the position of the reflector.

In carrying out the invention means may be provided for calculating the change in the value of the signal detected in the signal detector means due to displacement of the reflector, and means for dividing the said calculated change in value by the value of the signal detected in the reference detector means.

A further radiation source is coupled to a second optical fibre one end of which is positioned to direct radiation onto and receive radiation reflected back from the reflector, which fibre is coupled to the reference detector means.

In one preferred embodiment of the invention a single optical fibre is provided and light therefrom is directed onto two different colour filters in different positions, the light from one colour filter following an optical path to the reflector and back such that the amount of light reflected back to the fibre is dependent on the position of the reflector and the light from the other colour filter following a different optical path to the reflector and back such that the magnitude of the reflected light of the other colour is independent of the position of the reflector.

BRIEF DESCRIPTION OF THE DRAWINGS

In order that the invention may be more fully understood reference will now be made to the accompanying drawings in which FIGS. 1, 2 and 3 show embodiments of the invention utilising two optical fibres.

DETAILED DESCRIPTION OF PREFERRED EMBODIMENTS

Figure 4:
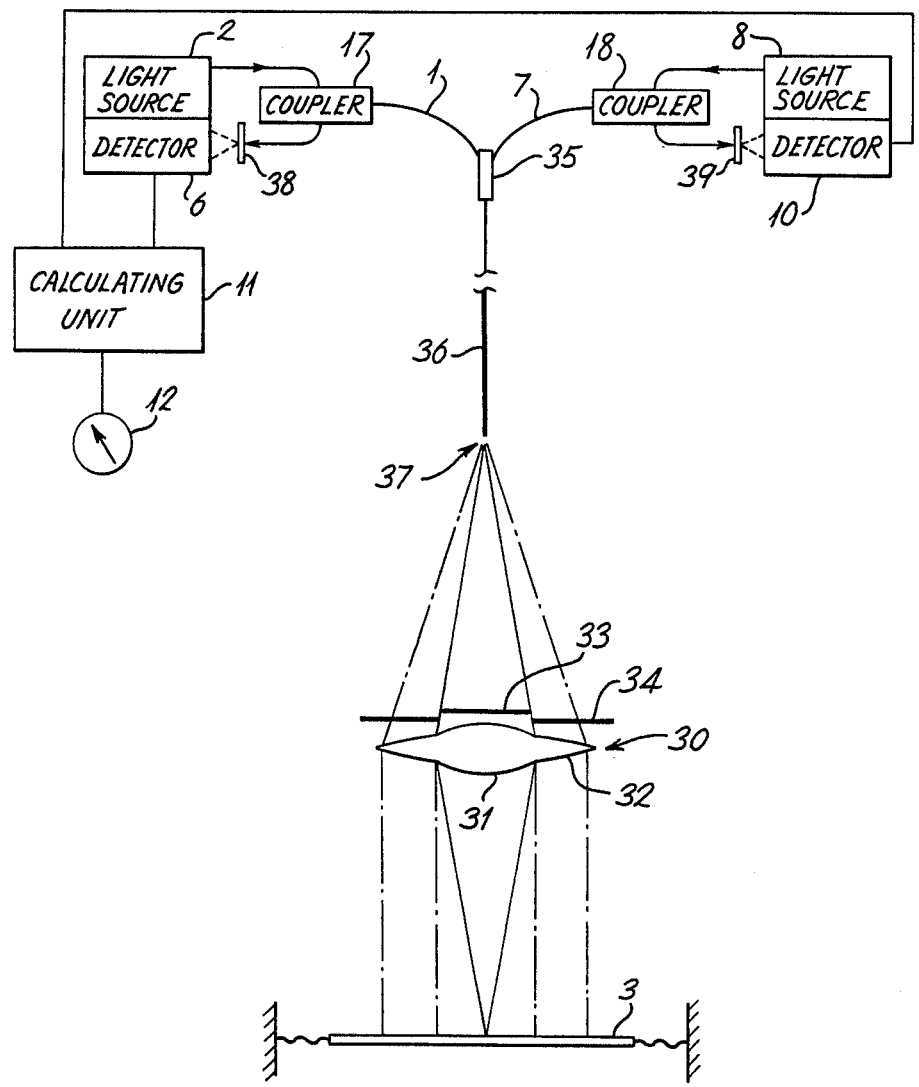
FIG. 4 illustrates an embodiment of the invention using a common optical fibre.

Referring now to FIG. 1 there is shown therein an optical displacement sensor comprising a main fibre 1 to which is coupled a light emitting source 2 such as a light emitting diode through one arm of a Y-coupler 17. It is desired to measure the displacement of a reflective membrane 3 which may form part of a gastight enclosure for example. A lens 4 is provided of focal length f and the tip 5 of fibre 1 is positioned at a distance 2f from the lens and likewise the lens is positioned at a distance 2f from membrane 3. The light emitted from tip 5 of fibre 1 will thus be brought to a focus on the surface of the membrane and displacement of membrane 3 from the focal point will cause a change in the magnitude of the light reflected back from membrane 3 through lens 4 to tip 5 of fibre 1. For small deflections at least the change in the amount of light reflected back to tip 5 of fibre 1 is linearly related to the displacement of membrane 3.

The reflected light will return along fibre 1 and be detected is a detector 6 coupled to the other arm of Y-coupler 17. The change in the amount of light that is detected in detector 6 will therefore be proportional to the displacement of membrane 3 for small deflections of the membrane from the focus of the light passing through lens 4. However this relationship will be affected by any deterioration in the quality of the reflecting surface of membrane 3. In order to provide compensation for such deterioration a second optical fibre 7 is provided energised from a light source 8 coupled to fibre 7 through one arm of a Y-coupler 18. The tip 9 of fibre 7 is positioned at a distance f from lens 4 so that the light therefrom emerges as a parallel ray and is directed onto the surface of reflector 3. Reflector 3 will return this light back to the focal point of lens 4 where the tip 9 of fibre 7 is positioned and this light will pass back along fibre 7 and through the other arm of coupler 18 to a light detector 10.

In use of the equipment the magnitude of the signal detected in detector 6 can be calibrated in terms of the displacement of the membrane 3. Provided there is no change in the reflective properties of membrane 3 then this calibration will remain valid throughout the lifetime of the apparatus. In practice, however, it is likely that the reflective quality of membrane 3 will deteriorate. In order to compensate for this the signal obtained from detector 6 is processed by being divided by the magnitude of the signal from detector 10 in a suitable processing unit 11. It is the processed signal output from unit 11 that is then used for indicating the displacement of membrane 3, for example in a meter 12 which can be calibrated in terms of displacement or pressure. Any deterioration of the quality of the reflective surface of membrane which will reduce the signal received by detector 6 will cause a corresponding reduction in the signal in detector 10 so that the resultant quotient as displayed in meter 12 will remain constant for a given displacement of membrane 3.

An additional possible source of error lies in the differential ageing of the two fibres 1 and 7. In order to minimise the effects of such fibre ageing upon the measurements fibres 1 and 7 are of the same type and preferably originate from the same production batch. Further, they are preferably a twin cable.

The magnitude of the reflected signals may also change due to aging of the light emitting diodes 2 and 8. Provided that each of these items are appropriately matched an paired then any deterioration of one of these items will be matched by equal deterioration of the other so that there will be a corresponding reduction in the signal in detector 10 which can be used likewise to compensate for the signal in detector 6.

In the arrangement described with reference to FIG. 1 the tip 5 of fibre 1 is shown as being positioned at a distance $2f$ from lens 4. However, this is not necessary and tip 5 can be positioned at any convenient distance from lens 4 provided that its image is formed in the plane of membrane 3. However, a distance of $2f$ corresponds to unit magnification and to the minimum total length between tip 5 and membrane 3.

In place of the signal lens 4 shown in FIG. 1 a multiple lens arrangement can be provided and one such arrangement is shown in FIG. 2 in which like parts have like reference numerals to FIG. 1 except that the lens 4 of FIG. 1 is now replaced by a system of three lenses 13, 14 and 15. Lens 13 is positioned at a distance equal to its focal length from tip 5 so as to produce a collimated beam of light which is then brough to a focus in the plane of membrane 3 by the objective lenses 14 and 15. The function of lens 13 is to ensure a constant light gathering capability for the light flux emitted from tip 5 regardless of the objective lens arrangement that is selected. To enable the objective lenses 14 and 15 to collimate the beam from tip 9 to fibre 7 it may be desirable to drill a hole 16 through lens 13 to allow fibre 7 to pass therethrough. The arrangement of FIG. 2 with its separate objective lens arrangement has a greater sensitivity than the FIG. 1 arrangement.

A simpler optical system is shown in FIG. 3 in which only one lens 20 is used solely for the purpose of collimating the reference beam emerging from tip 9 of fibre 7. Fibre 1 passes through a hole 21 drilled in lens 20 and the light reflected back into fibre 1 for measuring purposes depends solely on the numerical aperture of fibre 1. It is not essential to pass fibre 1 through lens 21 and it could by-pass the lens altogether.

In the embodiments described above two separate light fibres 1 and 7 have been illustrated for the transmission and reception of light for measurement and reference respectively. However, it is not necessary for two separate optical fibres to be provided and provided suitable arrangements are made for discriminating between the two light sources a single optical fibre can be used. Such an arrangement is advantageous from the viewpoint of compensation for fibre ageing, particularly where there are long distances, say of the order of 1 km or more between the measurement position and the item being measured. One such arrangement is shown in FIG. 4 in which like parts have like reference numerals to FIG. 1.

In the FIG. 4 arrangement the optical fibre 7 carrying the reference light is not independently directed on to membrane 3 but instead its output and the output from fibre 1 are both coupled through a Y-coupler 35 to a common optical fibre 36 so that light from both sources 2 and 8 emerge from the end of tip 37 of fibre 36. In order to distinguish between the two light beams sources 2 and 8 have different wavelengths L1 and L2. By way of example L1 might be green light and L2 might be red light, although other wavelengths, which may be closer together, can be used. A bifocal lens 30 is provided on to which the light of the two wavelengths L1 and L2 emerging from tip 37 is directed. Bifocal lens 30 has a centre part 31 of shorter focal length than its outer annular part 32. Colour filters 33 and 34 are positioned just in front of lens 30. Filter 33 passes light of wavelength L1 only and coincides in extent with the area of the inner shorter focal length part 31 of lens 30. Filter 34 is annular in shape and is of the same extent as outer annular part 32 of lens 30. Filter 34 passes light of wavelength L2 only.

The distance between tip 37 and lens 30 is equal to $2f1$ where f1 is the focal length of part 31 and is also equal to f2 the focal length of part 32 of lens 30. Thus the green light L1 will be focussed to a point on membrane 3 whereas the red light L2 will be collimated into a parallel beam. The reflected portion of green light passes into detector 6 via a gream filter 38 and provides the measuring signal whereas the reflected portion of the red light passes back to detector 10 via a red filter 39 and provides the reference signal.

As a further aid to selective reception it is possible to pulse the green and red light sources 2 and 8 alternately in sequence so that only one light beam is present at any one time and simultaneously to enable only the associated detector 6 or 10 to respond to light stimulation.

In all of the above described embodiments two separate light sources 2 and 8 are shown. These may be replaced by a single light source and a beam splitter having two outputs respectively feeding the Y-couplers 17 and 18. Whether two light sources or a single light source is provided it is desirable to ensure that the light outputs to the two optic fibres are of equal amplitude or at least have a constant amplitude ratio.

I claim:

1. An optical displacement sensor comprising a reflector the displacement of which is to be measured, a first monochromatic radiation source coupled to a single optical fibre one end of which is directed onto the reflector so as to illuminate the reflector with radiation from the source, signal detector means for detecting and measuring radiation reflected back from the reflector to said one end and along said optical fibre and arranged so that the amount of the reflected radiation detected is a function of the position of the reflector, a further monochromatic radiation source, an optical path from said further monochromatic radiation source and arranged to enable radiation from said further source to illuminate said reflector, and reference detector means for detecting and measuring radiation from said further monochromatic radiation source reflected back from the reflector, said optical path being arranged so that the amount of the reflected radiation detected in the reference detector means is independent of the position of the reflector.

2. The sensor as claimed in claim 1 in which means are provided for calculating the change in the value of the signal detected in the signal detector means due to displacement of the reflector, and means for dividing the said calculated change in value by the value of the signal detected in the reference detector means.

3. The sensor as claimed in claim 1 in which the further radiation source is coupled to a second optical fibre one end of which is positioned to direct radiation onto and receives radiation reflected back from the reflector, which fibre is coupled to said reference detector means.

4. The sensor as claimed in claim 1 in which the further monochromatic radiation source is of a different colour to said first monochromatic radiation source, a single optical fibre to which both said radiation sources are coupled is provided and light therefrom is directed onto two different colour filters, each colour filter passing light from a respective source, the light from one colour filter following an optical path to the reflector and back such that the amount of light reflected back to the fibre is dependent on the position of the reflector and the light from the other colour filter following a different optical path to the reflector and back such that the magnitude of the reflected light of the other colour is independent of the position of the reflector.

* * * * *